Figure 1:
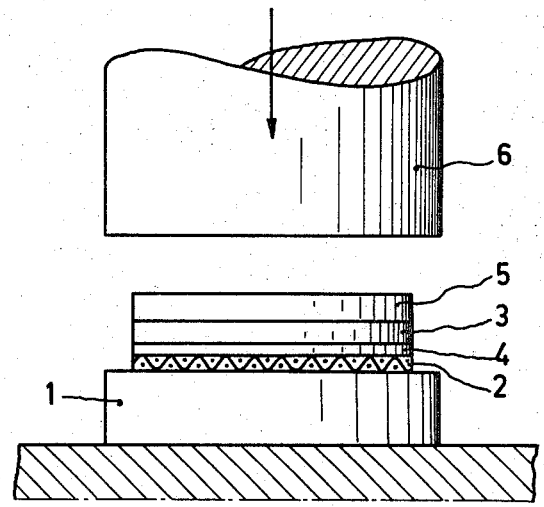

United States Patent

[11] 3,571,984

[72] Inventors Jacob Koorneef;
Jules Bos, Emmasingel, Eindhoven, Netherlands
[21] Appl. No. 783,619
[22] Filed Dec. 13, 1968
[45] Patented Mar. 23, 1971
[73] Assignee U.S. Philips Corporation
New York, N.Y.

[54] METHOD OF GRINDING THIN PLATES
5 Claims, 2 Drawing Figs.
[52] U.S. Cl. .................................................. 51/281, 51/277
[51] Int. Cl. .................................................. B24b 1/00
[50] Field of Search ........................................ 51/281, 277, 283

[56] References Cited
UNITED STATES PATENTS
2,340,843 2/1944 Bailey .......................... 51/283X
3,041,800 7/1962 Heisel .......................... 51/277
3,123,953 3/1964 Merkl .......................... 51/283
3,475,867 11/1969 Walsh .......................... 51/277X
3,488,895 1/1970 Thompson .................... 51/283

Primary Examiner—Lester M. Swingle
Attorney—Frank R. Trifari

ABSTRACT: A method of grinding thin plates of brittle material for use such as a diaphragm in a hearing aid to an accurately defined thickness and with precise tolerances by coating one side of the plate with an adhesive material or cement and supporting the plate on a support member and placing between the plate and the support a brass wire mesh so that the adhesive will be pressed into the mesh and will absorb any foreign matter in the cement so as not to effect the defined thickness of the plate.

METHOD OF GRINDING THIN PLATES

The invention relates to a method of grinding plates, for example, of a brittle material, to a very accurately defined small thickness, in which a plate is arranged on a support and is ground to thickness.

Such plates, which have to fulfill very stringent requirements as to thickness, are used, for example, as diaphragms in hearing aids, as parts of electric capacitors, etc. Hitherto, only those highly skilled in the art have been able to manufacture these plates with an extremely accurately defined thickness in a reproducible manner. This is mainly due to the fact that the thickness of the adhesion seam by means of which the plate can be secured on the support is not uniform. This is due inter alia to the presence of contaminations in the adhesive, to a nonuniform viscosity of the adhesive and to any dust particles located during the adhesion between the plate and the support. This nonuniform thickness of the adhesion seam may result in a wrong thickness of the plates manufactured.

An object of the invention is to provide a method by which plates having a uniform accurately defined thickness can be manufactured in a reproducible manner, without requiring the attention of skilled craftsmen. According to the invention, this is achieved by disposing a metal wire mesh on a flat support, whereupon the plate to be ground to a thin thickness is pressed by a flat side on the metal mesh with the interposition of an adhesive and the grinding operation is carried out. The thickness of the plate is defined by measuring the distance between the upper side of the plate and a fixed point on the support, whereupon the plate is removed from the support, for example, by means of a solvent for the adhesive.

The adhesive and any dust particles between the plate and the support are now pressed into the meshes of the wires. The thickness of the adhesion seam is now determined solely by the thickness of the metal wire mesh. It has been found that metal mesh has a very accurately defined thickness. If, for example, a grinding stone has arrived at a distance from the support which is equal to the desired thickness of the plate plus the accurately defined thickness of the metal mesh, the plate has attained the desired thickness. It has been found that with the method according to the invention, the tolerances in thickness can be kept within 2 $\mu$, and reproducible results can be obtained.

In a preferred embodiment according to the invention, the metal wire mesh used is a brass mesh having a mesh width of approximately 70 $\mu$. It has been found that this mesh which is commercially available and has been woven from one wire, has accurately parallel upper and lower surfaces and, after being lightly repressed, has an accurately defined thickness.

In another embodiment according to the invention, the plate is secured on the support by coating a flat side with a layer of cement, whereupon the plate is placed by the side coated with the layer of cement on the mesh disposed on the support, a slightly resilient strip then being disposed on the support and the resulting assembly being subjected to a pressure, whilst heat is supplied for melting the cement, whereupon the assembly is cooled again. A very satisfactory adhesion is obtained between the plate and the support. The resilient strip, for example, a strip of synthetic resin, exerts during pressing a uniform pressure on the brittle plate due to its flexibility, as a result of which the plate does not break, whilst the synthetic resin does not adhere to the cement.

Figure 2:
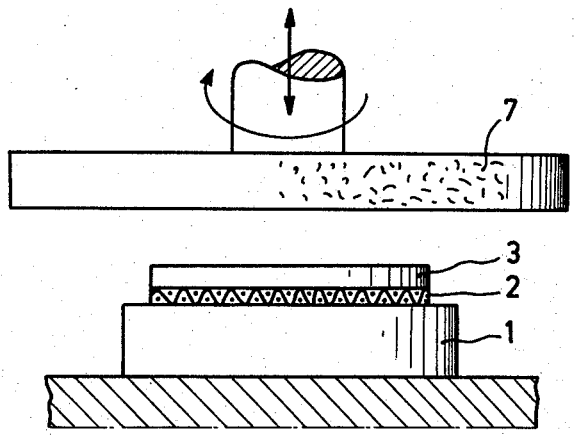

The invention will now be described more fully with reference to the drawing in which:

FIG. 1 is an elevational view showing the arrangement of elements to carry out the method of the invention; and FIG. 2 is an elevational view showing the arrangement for grinding.

In the embodiment shown, plates of ceramic material for piezoelectric effect, to be used as diaphragms in hearing aids are ground in a reproducible manner to a thickness of 20 $\mu$. As a matter of course, also other materials may be ground to an arbitrary desired accurately defined thickness.

FIG. 1 shows a support 1 arranged on a substratum. On this support is disposed a brass wire mesh 2 having a mesh width of approximately 70 $\mu$. A plate of piezoelectric material 3 having a thickness of approximately 1 mm. is coated on one side with a cement 4 and is placed on the brass mesh 2, its side coated with cement being in contact with the mesh. On the other side of plate 3 is placed, for example, a Teflon plate 5 and the resulting assembly is subjected to pressure by means of a pressure die 6, whilst the assembly is heated to a temperature at which the cement liquifies. The cement 4 is now pressed into the brass mesh 2 and the plate 3 fully adheres to the support 1. Any contaminations in the cement and any dust particles between the plate 3 and the support 1 are then entirely pressed into the meshes of the wires 2 having a very uniform thickness. After the assembly has been cooled the support 1 with the plate 3 secured thereto is removed from the press.

The support 1 consists of a hard nondeformable material, preferably of Ferroxcube (a double ferrite, one having one or more divalent metals such as described in the text "Ferromagnetism" by Richard M. Bozorth, Page 247) or cast iron, which can be readily secured on a magnetic bed of a grinding machine.

FIG. 2 shows the magnetically secured support 1 with the plate 3 secured thereto and a grinding stone 7 provided, for example, with diamond grains which is rotatable and axially displaceable. The grinding stone 7 is moved towards the support 1, the depth being adjusted so that the distance from the grinding surface to the support is accurately equal to the sum of the desired thickness of the plate 3 and the thickness of the brass mesh 2. The brass mesh is found to have such an accurately defined thickness that plates can be ground by the method described in one operation in a reproducible manner to a thickness of approximately 20 $\mu$, the tolerances being smaller than 2 $\mu$. In order to obtain a very smooth surface of the plate, the mechanical operation may be followed by a manual operation. After the grinding operation, the plate is removed from the support by means of a solvent for the cement. The plate is now quite ready for use.

We claim:

1. A method of grinding thin plates of brittle material to an accurately defined thickness comprising the steps of placing a thin metal wire mesh on a support, coating one side of the plate to be ground with an adhesive, supporting the coated plate on said wire mesh with the adhesive coating being in contact with the mesh, applying heat to the plate so that the adhesive becomes fluid, applying pressure to the plate in a direction toward the support so that said fluid adhesive will be pressed into the mesh and into contact with the support whereby said plate will adhere to the support, grinding said plate while said plate is adhered to the support, and removing the plate from the support after grinding the plate to the desired thickness by applying a solvent for the adhesive.

2. The method according to claim 1 wherein said metal wire mesh is a brass mesh having a mesh width of approximately 70 $\mu$.

3. The method according to claim 2 wherein said support is cast iron.

4. The method according to claim 2 wherein said support is a Ferroxcube.

5. The method according to claim 1 further comprising the step of placing a slightly resilient strip of material on the plate prior to applying heat and pressure thereto.